United States Patent
Park

(10) Patent No.: US 10,086,658 B2
(45) Date of Patent: Oct. 2, 2018

(54) RUN-FLAT TIRE

(71) Applicant: BRIDGESTONE CORPORATION, Chuo-ku, Tokyo (JP)

(72) Inventor: Young Chul Park, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 505 days.

(21) Appl. No.: 14/527,145

(22) Filed: Oct. 29, 2014

(65) Prior Publication Data

US 2016/0121664 A1 May 5, 2016

(51) Int. Cl.
| | |
|---|---|
| *B60C 17/00* | (2006.01) |
| *B60C 15/00* | (2006.01) |
| *B60C 9/02* | (2006.01) |
| B60C 15/06 | (2006.01) |
| B60C 13/00 | (2006.01) |

(52) U.S. Cl.
CPC ........ *B60C 17/0009* (2013.01); *B60C 9/0207* (2013.01); *B60C 15/0009* (2013.01); *B60C 17/00* (2013.01); *B60C 2013/007* (2013.01); *B60C 2015/061* (2013.01); *B60C 2017/0072* (2013.01)

(58) Field of Classification Search
CPC ..... B60C 17/00; B60C 17/0009; B60C 17/08; B60C 19/00; B60C 15/0009; B60C 9/0207; B60C 2017/0054; B60C 2015/009; Y10S 152/00; E04B 1/003; E04B 1/16
USPC ................ 152/516, 517, 522, 541, 546, 555
See application file for complete search history.

(56) References Cited

U.S. PATENT DOCUMENTS

| | | | | |
|---|---|---|---|---|
| 5,058,646 | A * | 10/1991 | Kajikawa | B60C 3/04 152/454 |
| 6,533,011 | B2 * | 3/2003 | Tobino | B60C 15/0045 152/454 |
| 2002/0003017 | A1 * | 1/2002 | Baumann | B60C 1/0025 152/517 |
| 2006/0201599 | A1 * | 9/2006 | Tanaka | B60C 9/08 152/517 |
| 2009/0101267 | A1 * | 4/2009 | Neubauer | B60C 9/04 152/556 |
| 2009/0320984 | A1 * | 12/2009 | Maehara | B60C 9/0042 152/517 |

(Continued)

FOREIGN PATENT DOCUMENTS

JP 2012-11897 A 1/2012

*Primary Examiner* — Robert C Dye
*Assistant Examiner* — Sedef Esra Ayalp Paquette
(74) *Attorney, Agent, or Firm* — Sughrue Mion, PLLC

(57) ABSTRACT

A run-flat tire ensures run-flat durability with a reduced weight. A tire radial outermost carcass ply of two or more carcass plies has tire widthwise inner ends in a crown portion. A bead filler and side reinforcing rubber have an overlapping part in the tire width direction. In a cross section of the run-flat tire in the tire width direction in a state where the run-flat tire is attached to an applicable rim, filled to a specified internal pressure, and placed under no load, a thickness d1 of a sidewall portion at a midpoint in the tire radial direction between a maximum width position of the run-flat tire and a tire radial outermost position of a bead core is greater than a thickness d2 of the sidewall portion at a midpoint in the tire radial direction between the maximum width position of the run-flat tire and a tread edge.

5 Claims, 1 Drawing Sheet

(56) References Cited

U.S. PATENT DOCUMENTS

2012/0152426 A1\* 6/2012 Maehara ............ B60C 17/0009
152/517

\* cited by examiner

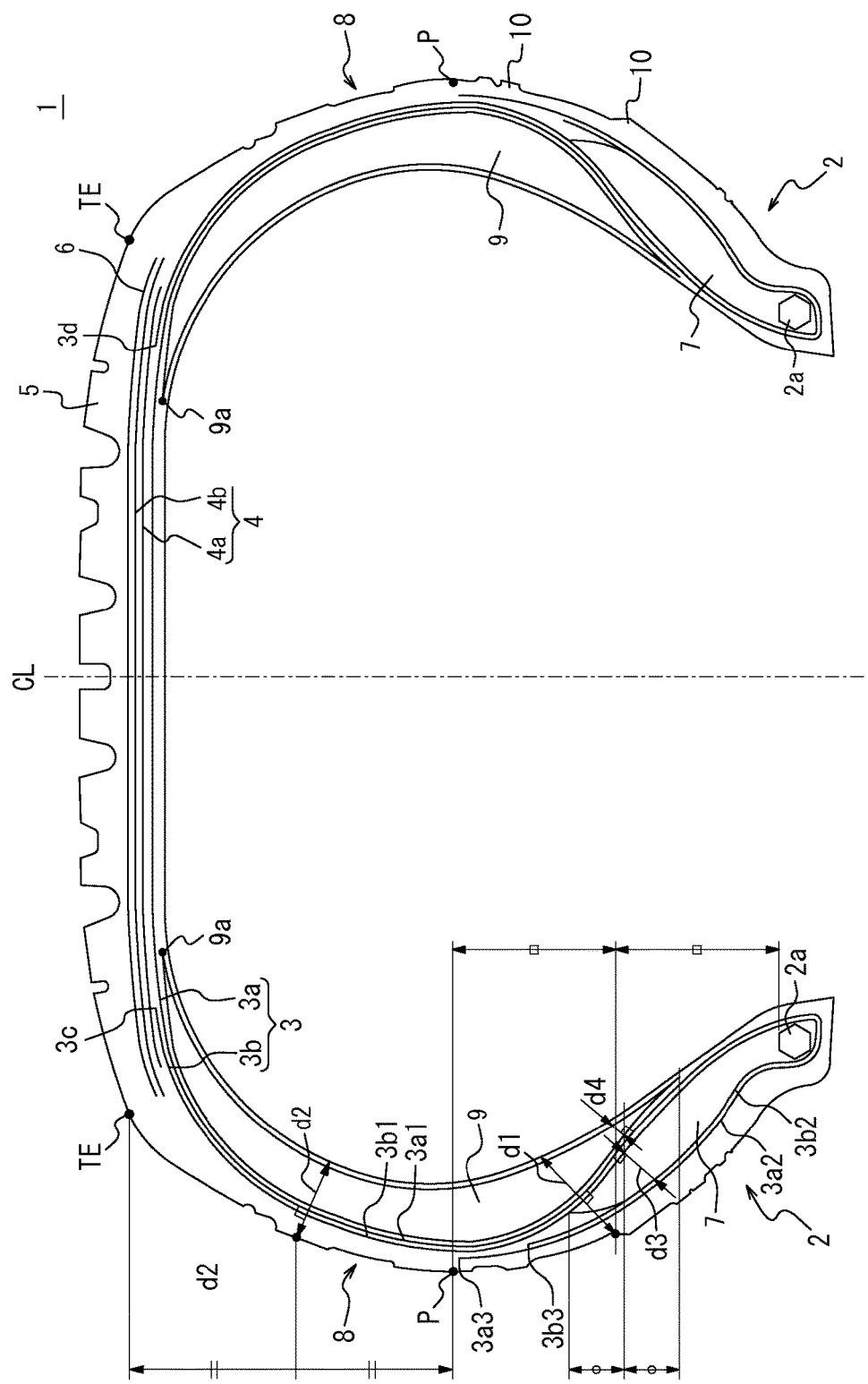

RUN-FLAT TIRE

TECHNICAL FIELD

The present invention relates to a run-flat tire.

BACKGROUND ART

As a tire that can run for a certain distance even when the internal pressure of the tire decreases due to a puncture or the like, a side-reinforced run-flat tire in which a side reinforcing rubber layer crescent in cross section is provided in each sidewall portion has been conventionally available. Such a run-flat tire normally supports the load by the internal pressure of the tire and, when the internal pressure decreases, supports the load by the side reinforcing rubber layer instead.

Regarding the run-flat tire, the following technique for achieving both run-flat durability and tire weight reduction has been proposed: a crown portion of a carcass extending between a pair of bead portions is partially hollowed out to form a pair of divided carcasses (for example, see Patent Literature (PTL) 1).

CITATION LIST

Patent Literature

PTL 1: Japanese Unexamined Patent Application Publication No. 2012-011897

SUMMARY OF INVENTION

Technical Problem

The above-mentioned technique, however, tends to cause a decrease in run-flat durability because the carcass is partially hollowed out.

The present invention has been made to solve the problem stated above, and has an object of providing a run-flat tire that ensures run-flat durability while having lower rolling resistance by its reduced weight.

Solution to Problem

The present invention basically has the following structure.

A run-flat tire according to the present invention includes: a pair of bead cores; a carcass composed of two or more carcass plies toroidally extending between the pair of bead cores; a bead filler located on an outer side of each of the bead cores in a tire radial direction; a pair of sidewall portions; and side reinforcing rubber located in each of the sidewall portions, the side reinforcing rubber being crescent in cross section in a tire width direction, wherein a tire radial outermost carcass ply of the two or more carcass plies has tire widthwise inner ends in a crown portion, wherein the bead filler and the side reinforcing rubber have an overlapping part in the tire width direction, and wherein, in a cross section of the run-flat tire in the tire width direction in a state where the run-flat tire is attached to an applicable rim, filled to a specified internal pressure, and placed under no load, a thickness d1 of the sidewall portion at a midpoint in the tire radial direction between a maximum width position of the run-flat tire and a tire radial outermost position of the bead core is greater than a thickness d2 of the sidewall portion at a midpoint in the tire radial direction between the maximum width position of the run-flat tire and a tread edge.

The run-flat tire according to the present invention ensures run-flat durability while having lower rolling resistance by its reduced weight.

The "thickness d1" is the thickness of the sidewall portion from the point on the external surface, which corresponds to the midpoint in the tire radial direction between the maximum width position of the run-flat tire and the tire radial outermost position of the bead core, to the internal surface of the run-flat tire, as measured in the direction of the perpendicular from the point on the external surface to the carcass (in the case where the carcass has a carcass body portion and a carcass folded portion, the carcass body portion). Likewise, the "thickness d2" is the thickness of the sidewall portion from the point on the external surface, which corresponds to the midpoint in the tire radial direction between the maximum width position of the run-flat tire and the tread edge, to the internal surface of the run-flat tire, as measured in the direction of the perpendicular from the point on the external surface to the carcass.

The "applicable rim" is the design rim in the applicable size described in, for example, the Year Book of the Tire and Rim Association, Inc. (TRA) in the United States, which is an effective industrial standard in areas where tires are produced and used. The "specified internal pressure" is the air pressure corresponding to the maximum load capacity in the applicable size/ply rating described in, for example, the Year Book of TRA.

The "tread edge" is the tire widthwise outermost position of the outer circumferential surface of the whole tire, which comes into contact with the road surface when the tire rolls in a state where the tire is attached to the applicable rim, filled to the specified internal pressure, and placed under the maximum load (the load corresponding to the above-mentioned maximum load capacity).

In the run-flat tire according to the present invention, a ratio d4/d3 preferably satisfies a relational expression $0.8 \leq d4/d3 \leq 1.2$, where d3 is a thickness of the bead filler at a midpoint in the tire radial direction of the overlapping part in the tire width direction between the bead filler and the side reinforcing rubber, and d4 is a thickness of the side reinforcing rubber at the midpoint in the tire radial direction of the overlapping part in the tire width direction between the bead filler and the side reinforcing rubber, each of the thickness d3 and the thickness d4 being in a direction perpendicular to the carcass.

The run-flat durability can be further improved when the ratio d4/d3 satisfies the relational expression.

In the case where the carcass is composed of a plurality of carcass plies, the "thickness d3" is the thickness at the midpoint in the tire radial direction as measured in the direction perpendicular to the carcass ply closest to the bead filler, and the "thickness d4" is the thickness at the midpoint in the tire radial direction as measured in the direction perpendicular to the carcass ply closest to the side reinforcing rubber.

The "direction perpendicular to the carcass" is the direction perpendicular to the carcass body portion in the case where the carcass has the carcass body portion and the carcass folded portion.

Advantageous Effect of Invention

According to the present invention, it is possible to provide a run-flat tire that ensures run-flat durability while having lower rolling resistance by its reduced weight.

BRIEF DESCRIPTION OF DRAWINGS

The present invention will be further described below with reference to the accompanying drawings, wherein FIG. 1 is a sectional view of a run-flat tire in the tire width direction according to an embodiment of the present invention.

DESCRIPTION OF EMBODIMENTS

The following illustrates and describes an embodiment of the present invention in detail, with reference to drawings.

FIG. 1 is a sectional view of a run-flat tire (hereafter also simply referred to as "tire") in the tire width direction according to an embodiment of the present invention. FIG. 1 shows the cross section of the tire in the tire width direction in a state where the tire is attached to the applicable rim, filled to the specified internal pressure, and placed under no load.

As shown in FIG. 1, a tire 1 includes: a pair of bead cores 2a buried in a pair of bead portions 2; and a carcass 3 composed of two or more (two in the example in FIG. 1) carcass plies 3a and 3b toroidally extending between the pair of bead cores 2a.

The carcass plies 3a and 3b respectively have: carcass body portions 3a1 and 3b1; and carcass folded portions 3a2 and 3b2 extending from the carcass body portions 3a1 and 3b1 and folded from inside to outside in the tire width direction around the bead core 2.

In the tire 1 shown in FIG. 1, the tire radial outermost carcass ply 3b of the two carcass plies 3a and 3b has tire widthwise inner ends 3c and 3d in a crown portion, and is hollowed out between the tire widthwise inner ends 3c and 3d to form a pair of divided carcass plies.

The tire radial outermost carcass ply 3b of the two carcass plies 3a and 3b thus has the tire widthwise inner ends 3c and 3d in the crown portion. This reduces the weight of the carcass ply 3b, compared with the case where the carcass ply 3b has no gap between the pair of bead cores 2a like the carcass ply 3a.

For example, the cords of the carcass 3 are rayon cords or the like, though the material of the cords of the carcass 3 is not particularly limited. The cords used in the two carcass plies 3a and 3b are preferably made of the same material in terms of cost.

The carcass 3 is preferably a radial carcass with cords extending along the tire radial direction.

The tire 1 also includes: a belt 4 composed of one or more belt layers (two belt layers 4a and 4b in the example in FIG. 1); and a tread 5, in order on the tire radial outer side of the crown portion of the carcass 3, as shown in FIG. 1. In this embodiment, one or more belt reinforcing layers 6 (one belt reinforcing layer 6 in the example in FIG. 1) are provided on the tire radial outer side of the belt 4.

The two belt layers 4a and 4b in this example are inclined belt layers having belt cords that cross each other between layers, and the belt cords are inclined at an angle of 62° to 64° with respect to the tire width direction. The belt reinforcing layer 6, on the other hand, is made up of cords extending substantially in the tire circumferential direction (for example, less than or equal to 5° with respect to the tire circumferential direction). For example, the cords of the belt 4 and the belt reinforcing layer 6 are steel cords or the like, though the materials of the cords of the belt 4 and the belt reinforcing layer 6 are not particularly limited.

The present invention is not limited to the belt structure of the example described above, and any number of layers of the belt 4, any number of belt reinforcing layers 6, and any material of belt cords may be used. The tire according to the present invention may include no belt reinforcing layer 6.

In the example in FIG. 1, the tire widthwise inner ends 3c and 3d of the carcass ply 3b are 10 mm or more inside in the tire width direction from the respective ends of the tire radial innermost belt layer 4a. In the present invention, the tire widthwise inner ends 3c and 3d of the carcass ply 3b are preferably 15 mm to 20 mm inside in the tire width direction from the respective ends of the tire radial innermost belt layer 4a. When the tire widthwise inner ends 3c and 3d of the carcass ply 3b are 15 mm or more inside in the tire width direction from the respective ends of the tire radial innermost belt layer 4a, the radial growth of the tire can be suppressed to prevent partial wear in the tire width direction. When the tire widthwise inner ends 3c and 3d of the carcass ply 3b are 20 mm or less inside in the tire width direction from the respective ends of the tire radial innermost belt layer 4a, the weight can be reduced sufficiently and also the ground contact length can be secured to effectively attain the driving stability.

A bead filler 7 is located on the tire radial outer side of each bead core 2a, as shown in FIG. 1. In the example in FIG. 1, the thickness of the bead filler 7 in the tire width direction gradually increases outward in the tire radial direction from the tire radial innermost part adjacent to the bead core 2a to around the tire radial center position of the bead filler 7, and gradually decreases outward in the tire radial direction from around the tire radial center position to the tire radial outermost part of the bead filler 7.

The tire 1 also includes a pair of sidewall portions 8 connected between the tread 5 and the pair of bead portions 2. The pair of sidewall portions 8 each include side reinforcing rubber 9 crescent in cross section in the tire width direction.

In the run-flat tire in this embodiment, the bead filler 7 and the side reinforcing rubber 9 have an overlapping part in the tire width direction. In the example in FIG. 1, a part of the bead filler 7 that gradually decreases in thickness in the tire width direction outward in the tire radial direction in the tire radial outer part from around the tire radial center position of the bead filler 7 and a tire radial inner part of the side reinforcing rubber 9 crescent in cross section that gradually decreases in thickness in the tire width direction inward in the tire radial direction overlap each other in the tire width direction.

In the run-flat tire in this embodiment, the carcass body portions 3a1 and 3b1 are each sandwiched between the bead filler 7 and the side reinforcing rubber 9.

In the run-flat tire in this embodiment, in the cross section in the tire width direction in a state where the tire is attached to the applicable rim, filled to the specified internal pressure, and placed under no load, the thickness d1 of the sidewall portion 8 at the midpoint in the tire radial direction between the tire maximum width position P (the maximum width position of the run-flat tire) and the tire radial outermost position of the bead core 2a is greater than the thickness d2 of the sidewall portion 8 at the midpoint in the tire radial direction between the tire maximum width position P and the tread edge TE.

The working effects of the run-flat tire in this embodiment are described below.

As a result of intensive studies to solve the problem stated above, the present inventors have found the following: In the above-mentioned hollow carcass structure in which the tire radial outermost carcass ply 3b has the tire widthwise inner ends 3c and 3d in the crown portion, the tensile load on the carcass 3 near the bead portion 2 increases during run-flat driving, which tends to cause a failure of the bead filler 7 or the side reinforcing rubber 9 near the bead portion 2.

In the run-flat tire in this embodiment, the bead filler 7 and the side reinforcing rubber 9 have the overlapping part in the tire width direction. This reduces the tensile load on the carcass 3 near the bead portion 2.

In addition, since the thickness d1 is greater than the thickness d2, the sidewall portion 8 is relatively thick near the bead portion 2 compared with near the buttress portion. This reduces the tensile load on the carcass 3 near the bead portion 2.

Therefore, in the run-flat tire in this embodiment, the tensile load is reduced to disperse strains of the sides and suppress heat generation, thus preventing a failure of the bead filler 7 or the side reinforcing rubber 9 near the bead portion 2. The run-flat durability of the run-flat tire can be improved in this way.

In more detail, the thickness d3 is preferably 4 mm to 5 mm, and the thickness d4 is preferably 4 mm to 6 mm.

In the run-flat tire according to the present invention, the ratio d4/d3 preferably satisfies the following relational expression:

$$0.8 \leq d4/d3 \leq 1.2,$$

where d3 is the thickness of the bead filler 7 at the midpoint in the tire radial direction of the overlapping part in the tire width direction between the bead filler 7 and the side reinforcing rubber 9 as measured in the direction perpendicular to the carcass 3 (the carcass body portion 3b1 of the carcass ply 3b) (that is, the thickness of the bead filler 7 measured in the normal direction at the point on the carcass 3 (the carcass body portion 3b1 of the carcass ply 3b) corresponding to the midpoint in the tire radial direction of the overlapping part), and d4 is the thickness of the side reinforcing rubber 9 at the midpoint in the tire radial direction of the overlapping part in the tire width direction between the bead filler 7 and the side reinforcing rubber 9 as measured in the direction perpendicular to the carcass 3 (the carcass body portion 3a1 of the carcass ply 3a) (that is, the thickness of the side reinforcing rubber 9 measured in the normal direction at the point on the carcass 3 (the carcass body portion 3a1 of the carcass ply 3a) corresponding to the midpoint in the tire radial direction of the overlapping part).

When the thickness d3 and the thickness d4 are substantially equal, the tensile load on the carcass 3 sandwiched between the bead filler 7 and the side reinforcing rubber 9 near the bead portion 2 can be reduced. Even in the case where a tensile force acts on the carcass 3, the durability of the bead filler 7 and the side reinforcing rubber 9 is ensured, thus preventing a failure of the bead filler 7 or the side reinforcing rubber 9 near the bead portion 2. The run-flat durability of the run-flat tire can be improved in this way.

In the present invention, fin-like protrusions 10 that protrude from the external surface of the sidewall portion 8 and extend in the tire radial direction are preferably formed on the external surface of the sidewall portion 8 at intervals in the tire circumferential direction. The fin-like protrusions 10 generate turbulence, which has the effect of cooling the sidewall portion 8. The durability of the tire can thus be enhanced. Though the fin-like protrusions 10 are provided only on the tire radial inner side of the tire maximum width position P in this embodiment, the present invention also includes the case where the fin-like protrusions 10 are provided on the tire radial outer side of the tire maximum width position P.

A rim guard that protrudes from the sidewall portion outward in the tire width direction so as to correspond to the rim flange external surface when the tire and the rim are assembled may also be provided, though not shown in this embodiment.

In the example in FIG. 1, a folded end 3a3 of the carcass folded portion 3a2 of the carcass ply 3a is located outside in the tire radial direction from a folded end 3b3 of the carcass folded portion 3b2 of the carcass ply 3b.

In more detail, in the example in FIG. 1, the folded end 3a3 of the carcass folded portion 3a2 of the carcass ply 3a is near the tire maximum width position P, whereas the folded end 3b3 of the carcass folded portion 3b2 of the carcass ply 3b is near the position of the midpoint in the tire radial direction between the tire maximum width position P and the tire radial outermost end of the bead filler 7.

Thus, in the present invention, the folded ends of the carcass folded portions of two or more carcass plies are preferably arranged at different positions in the tire radial direction.

Such arrangement suppresses the generation of a large shearing force near the folded end of the carcass folded portion, and contributes to higher run-flat durability.

Moreover, in the present invention, a tire widthwise inner end 9a of the side reinforcing rubber 9 is preferably 15 mm to 18 mm inside in the tire width direction from the end of tire radial innermost belt layer 4a.

When the tire widthwise inner end 9a of the side reinforcing rubber 9 is 15 mm or more inside in the tire width direction from the end of tire radial innermost belt layer 4a, higher run-flat durability can be ensured. When the tire widthwise inner end 9a of the side reinforcing rubber 9 is 18 mm or less inside in the tire width direction from the end of tire radial innermost belt layer 4a, higher ride quality can be ensured.

Examples

To determine the advantageous effects of the present invention, tires according to an invention example and a comparative example were made on an experimental basis with tire size 225/65RF17, and tested to evaluate their run-flat durability. The specifications of each of the tires are shown in Table 1 below. Note that the specifications not shown in Table 1 are common to the invention example and the comparative example.

(Tire Durability)

Each of the tires was attached to the applicable rim and filled to the specified internal pressure, and the run-flat durability was evaluated based on the distance traveled until the occurrence of a failure in the bead portion. The evaluation is indicated with the result of the comparative example being set to 100, where a larger value represents better tire durability.

The evaluation results are shown in Table 1 below.

TABLE 1

|  | Invention example | Comparative example |
|---|---|---|
| FIG. | FIG. 1 | — |
| d1 (mm) | 19 | 13 |
| d2 (mm) | 13 | 14 |
| d1 > d2 | Satisfied | Not satisfied |
| Run-flat durability | 123 | 100 |

The tire according to the invention example has better run-flat durability than the tire according to the comparative example, as can be understood from Table 1.

REFERENCE SIGNS LIST 1 tire
2 bead portion
2a bead core
3 carcass
3a, 3b carcass ply
3a1, 3b1 carcass body portion
3a2, 3b2 carcass folded portion
3a3, 3b3 folded end
3c, 3d tire widthwise inner end
4 belt
4a, 4b belt layer
5 tread
6 belt reinforcing layer
7 bead filler
8 sidewall portion
9 side reinforcing rubber
10 fin-like protrusion
CL tire equatorial plane
TE tread edge
P tire maximum width position

The invention claimed is:

1. A run-flat tire comprising:
a pair of bead cores;
a carcass composed of two or more carcass plies toroidally extending between the pair of bead cores;
a bead filler located on an outer side of each of the bead cores in a tire radial direction;
a pair of sidewall portions; and
side reinforcing rubber located in each of the sidewall portions, the side reinforcing rubber being crescent in cross section in a tire width direction,
wherein a carcass main body of a tire radial outermost carcass ply of the two or more carcass plies has tire widthwise inner ends in a crown portion,
wherein the bead filler and the side reinforcing rubber have an overlapping part in the tire width direction, and
wherein, in a cross section of the run-flat tire in the tire width direction in a state where the run-flat tire is attached to an applicable rim, filled to a specified internal pressure, and placed under no load, a thickness d1 of the sidewall portion at a midpoint in the tire radial direction between a maximum width position of the run-flat tire and a tire radial outermost position of the bead core is greater than a thickness d2 of the sidewall portion at a midpoint in the tire radial direction between the maximum width position of the run-flat tire and a tread edge; and
wherein a radially inner end of the side reinforcing rubber is located radially between the maximum width position of the run-flat tire and the tire radial outermost position of the bead core, such that the thickness d1 includes a thickness of the side reinforcing rubber at the midpoint in the tire radial direction between the maximum width position of the run-flat tire and the tire radial outermost position of the bead core,
wherein at the thickness d1 of the sidewall portion at the midpoint, a thickness of the side reinforcing rubber is larger than a thickness of the bead filler,
wherein the two or more carcass plies consist of two carcass plies;
wherein the tire radial outermost carcass ply has a carcass folded portion, such that a radial outer end of the carcass folded portion of the tire radial outermost carcass ply is positioned in the tire radial direction between the maximum width position of the run-flat tire and the tire radial outermost position of the bead core; and
wherein a tire radial inner carcass ply has a carcass folded portion, such that a radial outer end of the carcass folded portion of the tire radial inner carcass is positioned in the tire radial direction between the maximum width position of the run-flat tire and the radial outer end of the carcass folded portion of the tire radial outermost carcass ply.

2. The run-flat tire according to claim 1, wherein, in the cross section of the run-flat tire in the tire width direction in the state where the run-flat tire is attached to the applicable rim, filled to the specified internal pressure, and placed under no load, a ratio d4/d3 satisfies a relational expression $$0.8 \leq d4/d3 \leq 1.2,$$

where d3 is a thickness of the bead filler at a midpoint in the tire radial direction of the overlapping part in the tire width direction between the bead filler and the side reinforcing rubber, and d4 is a thickness of the side reinforcing rubber at the midpoint in the tire radial direction of the overlapping part in the tire width direction between the bead filler and the side reinforcing rubber, each of the thickness d3 and the thickness d4 being in a direction perpendicular to the carcass.

3. The run-flat tire according to claim 1, wherein a tire widthwise inner end of the side reinforcing rubber is positioned inward in the tire width direction of the tire widthwise inner end of the carcass main body of the tire radial outermost carcass ply.

4. The run-flat tire according to claim 1, wherein the two or more carcass plies are made of the same material.

5. The run-flat tire according to claim 1, wherein only one side reinforcing rubber exists in each sidewall portion in the tire width direction.

* * * * *